UNITED STATES PATENT OFFICE.

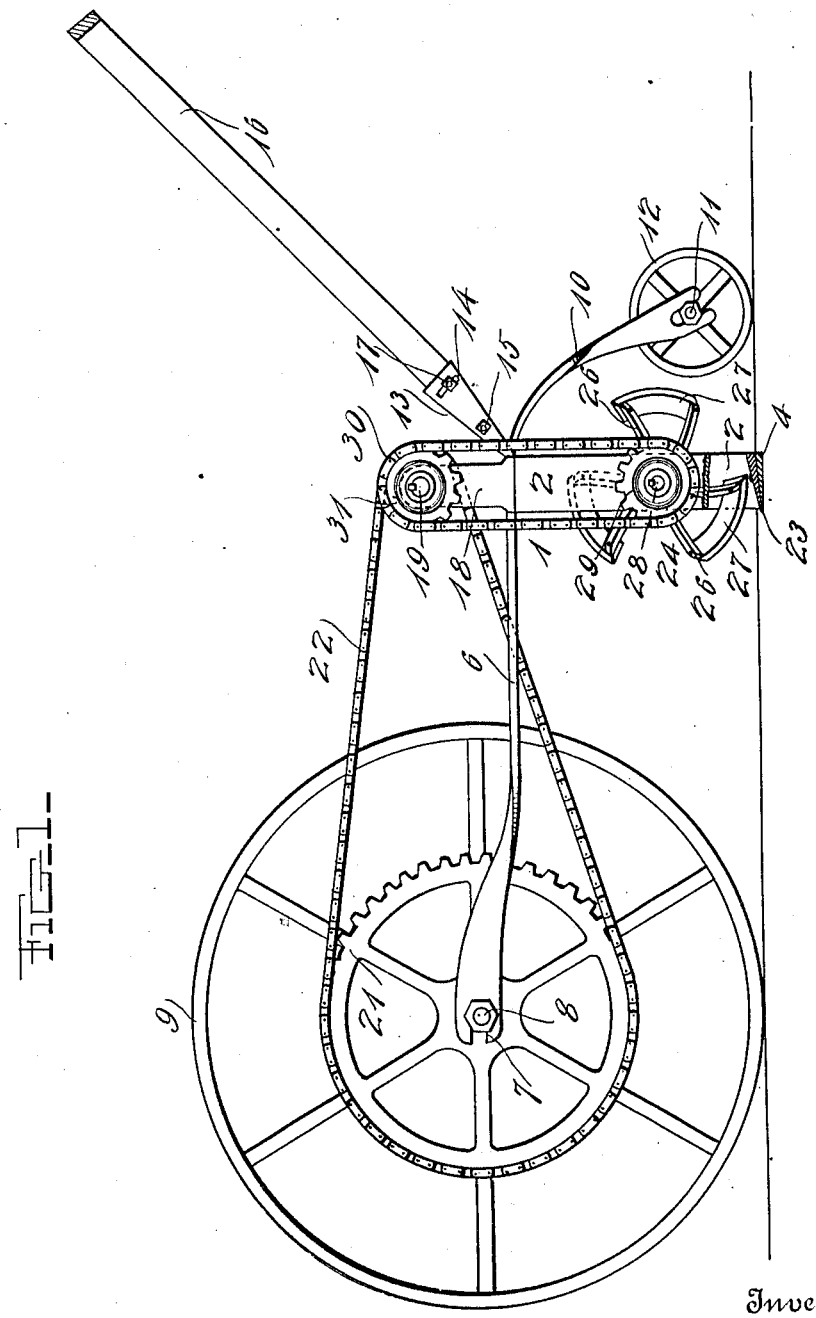

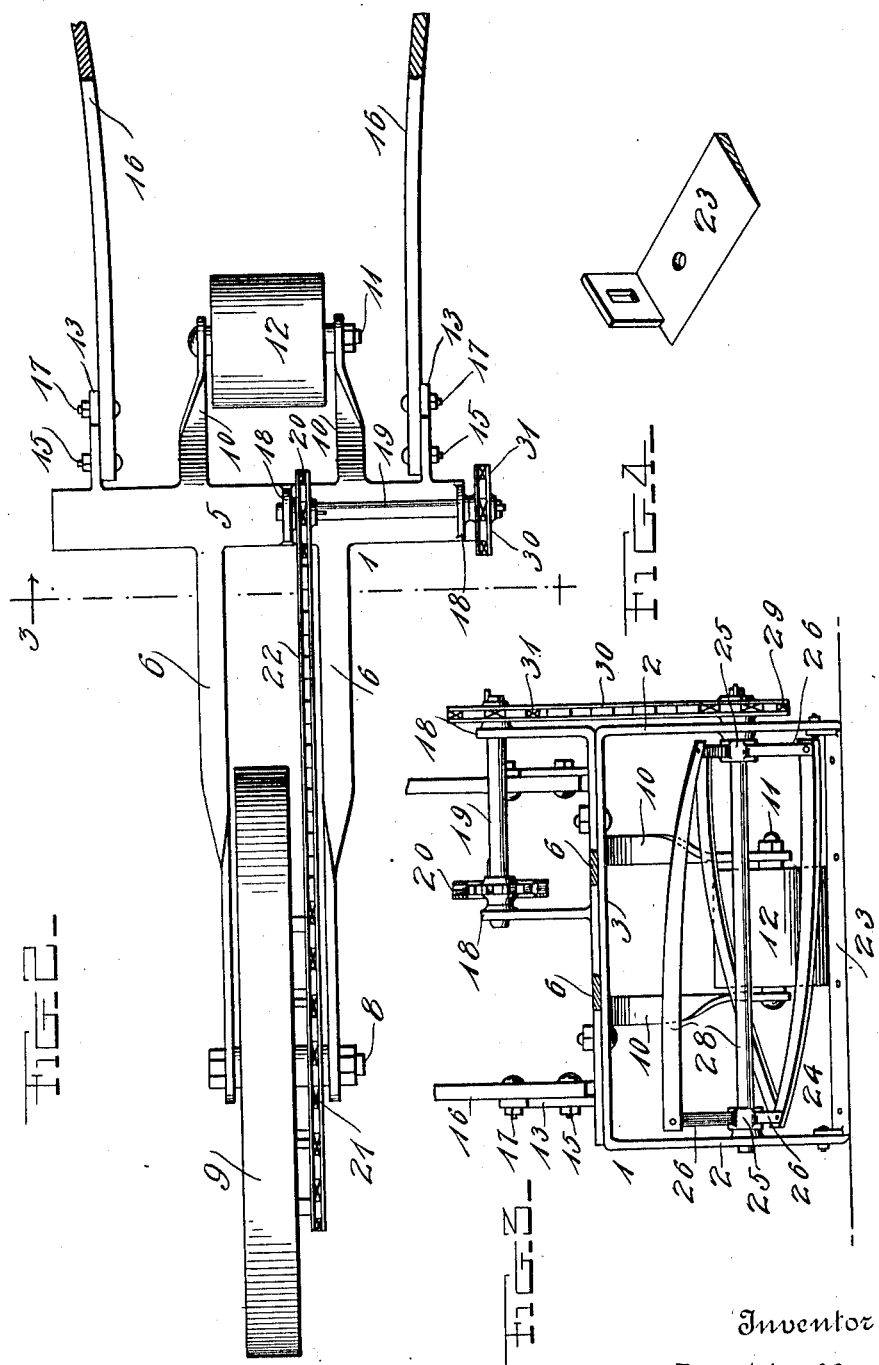

LOUIS LUCKHOFF, OF CANTON, OHIO.

WEED-DESTROYER.

1,020,614. Specification of Letters Patent. Patented Mar. 19, 1912.

Application filed October 5, 1911. Serial No. 653,085.

*To all whom it may concern:*

Be it known that I, LOUIS LUCKHOFF, a citizen of the United States, residing at Canton, in the county of Stark and State of Ohio, have invented certain new and useful Improvements in Weed-Destroyers; and I do declare the following to be a full, clear, and exact description of the invention, such as will enable others skilled in the art to which it appertains to make and use the same.

This invention relates to improvements in weed destroyers.

One object of the invention is to provide a weed destroyer having an improved construction and arrangement of knives adapted to cut the weeds below the ground and to mutilate the same to such an extent that they will be entirely destroyed.

Another object is to provide a machine of this character having supporting and operating wheels which enable the same to be readily pushed over the ground and the weeding operation thus greatly facilitated and speedily performed.

With these and other objects in view, the invention consists of certain novel features of construction, and the combination and arrangement of parts as will be more fully described and claimed.

In the accompanying drawings; Figure 1 is a side view of my improved weed destroying machine; Fig. 2 is a top plan view thereof; Fig. 3 is a vertical cross section on the line 3—3 of Fig. 2; Fig. 4 is a detail perspective view of a portion of the stationary blade of the machine.

My improved weed destroying machine comprises a cutter supporting frame 1 having vertically disposed side bars 2 connected at their upper ends by an integral cross bar 3 and at their lower ends by a similar cross bar 4, said bar 4 being beveled or inclined toward the front of the machine as shown. Bolted or otherwise secured to the upper cross bar 3 is a plate or bar 5 having formed on its forward edge a pair of forwardly extending arms or wheel supporting bars 6, said bars being given a quarter twist intermediate their ends so that the forward ends thereof form flat bearing plates having in their extremities notches 7 adapted to receive the ends of the axle 8 of a front supporting and driving wheel 9 which is revolubly mounted on the axle between the bars 6 as shown. On the rear edges of the plate 5 are formed rearwardly projecting downwardly curved rear wheel supporting bars 10 having notched lower ends in which is secured the axle 11 of a rear supporting wheel 12. Formed on the plate 5 near the ends thereof are substantially triangular handle attaching plates 13 having in their outer ends segmental slots 14. Pivotally connected at their inner ends to the plates 13 by pivot bolts 15 are operating handles 16 which project rearwardly from the machine as shown. The handles 16 are adjustably secured at the desired angle by clamping bolts 17 which are engaged with the handles and with the curved slots 14 in the plates as shown.

Arranged on the plate 5 at one side of the center thereof are a pair of upwardly projecting bearing standards 18 in which is revolubly mounted a cutter operating shaft 19 on the inner end of which is fixedly mounted a sprocket gear 20, said gear being connected with a similar gear 21 on the supporting and operating wheel 9 by a sprocket chain 22 whereby the movement of the supporting wheel is imparted to the shaft 19.

Secured to the plate 4 and to the lower ends of the side bars 2 is a stationary weed cutting blade 23, said blade being adapted to work beneath the surface of the ground and to cut through the roots of the weeds. Revolubly mounted in the side bars 2 at a suitable distance above the stationary blade 23 is a rotary cutter 24 comprising hubs 25 having a plurality of radially projecting blade supporting arms 26 to the outer ends of which are secured the opposite ends of rotary cutter blades 27, said blades being of slightly spiral form as shown. Arranged on one end of the shaft 28 of the rotary cutter is a sprocket gear 29 which is connected by a sprocket chain 30 to the sprocket gear 31 fixed on the adjacent end of the drive shaft 19 whereby the movement of said shaft is imparted to the rotary cutter when the machine is pushed along over the ground said cutter, co-acting with the stationary cutter 23, to further cut or mutilate the weeds and thus positively destroy the same.

From the foregoing description taken in connection with the accompanying drawings the construction and operation of the invention will be readily understood without requiring a more extended explanation.

Various changes in the form, proportion and the minor details of construction may be resorted to without departing from the principle or sacrificing any of the advantages of the invention as claimed.

Having thus described my invention, what I claim is:—

In a weed destroying machine, a cutter supporting frame, a stationary cutting blade secured in the lower end of said frame, wheel supporting bars secured to the upper end of the frame, an operating wheel revolubly mounted in said bars, rear supporting wheel bars secured to and projecting rearwardly from said frame, a rear supporting wheel revolubly mounted in said bars, a drive shaft revolubly mounted in said frame and geared to said operating wheel whereby said shaft is driven, a rotary cutter revolubly mounted in said frame and geared to said drive shaft whereby the cutter is driven, and operating handles connected with said frame.

In testimony whereof I have hereunto set my hand in presence of two subscribing witnesses.

LOUIS LUCKHOFF.

Witnesses:
LAURENCE C. KEELER,
C. H. WILLIAMS.

Copies of this patent may be obtained for five cents each, by addressing the "Commissioner of Patents, Washington, D. C."